(12) United States Patent
Yagishita

(10) Patent No.: US 9,471,983 B2
(45) Date of Patent: Oct. 18, 2016

(54) INFORMATION PROCESSING DEVICE, SYSTEM, AND INFORMATION PROCESSING METHOD

(71) Applicant: Takahiro Yagishita, Kanagawa (JP)

(72) Inventor: Takahiro Yagishita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 186 days.

(21) Appl. No.: 14/153,505

(22) Filed: Jan. 13, 2014

(65) Prior Publication Data

US 2014/0205151 A1 Jul. 24, 2014

(30) Foreign Application Priority Data

Jan. 22, 2013 (JP) ................................. 2013-009243

(51) Int. Cl.
*G06K 9/00* (2006.01)
*G06T 7/00* (2006.01)

(52) U.S. Cl.
CPC ... *G06T 7/0042* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 4,875,063 A | 10/1989 | Idenawa et al. | |
| 4,918,489 A | 4/1990 | Inage et al. | |
| 4,977,414 A | 12/1990 | Shimada et al. | |
| 5,019,913 A | 5/1991 | Kiya et al. | |
| 5,107,278 A | 4/1992 | Shimada et al. | |
| 5,491,506 A | 2/1996 | Yagishita et al. | |
| 5,565,907 A | 10/1996 | Wada et al. | |
| 5,677,700 A * | 10/1997 | Schwalba | G06F 3/011 345/173 |
| 5,923,828 A | 7/1999 | Yagishita | |
| 6,385,331 B2 * | 5/2002 | Harakawa | 345/156 |
| 6,480,623 B1 | 11/2002 | Yagishita et al. | |
| 6,507,674 B1 | 1/2003 | Yagishita et al. | |
| 6,519,052 B1 | 2/2003 | Oneda et al. | |
| 6,556,707 B1 | 4/2003 | Yagishita et al. | |
| 6,704,455 B1 | 3/2004 | Yamazaki et al. | |
| 6,788,811 B1 | 9/2004 | Matsuura et al. | |
| 7,046,387 B1 | 5/2006 | Yagishita et al. | |
| 7,502,488 B2 | 3/2009 | Abe et al. | |
| 8,295,652 B1 * | 10/2012 | Newstead | G06F 1/1637 361/679.05 |
| 2001/0022861 A1 * | 9/2001 | Hiramatsu | G06F 3/0425 382/291 |

(Continued)

FOREIGN PATENT DOCUMENTS

| | | | |
|---|---|---|---|
| JP | 2000066610 A | * | 3/2000 |
| JP | 3114813 | | 9/2000 |

(Continued)

*Primary Examiner* — Chan Park
*Assistant Examiner* — Iman K Kholdebarin
(74) *Attorney, Agent, or Firm* — Oblon, McClelland, Maier & Neustadt, L.L.P.

(57) ABSTRACT

An information processing device according to an embodiment of the present invention includes a detection unit, a calculation unit, a determination unit, and an estimation unit. The detection unit detects each three-dimensional position of a plurality of parts of an instruction object for indicating an image output surface. The calculation unit calculates an intersection point of a direction indicated by the instruction object and the image output surface based on each three-dimensional position of the parts of the instruction object. The determination unit determines whether the intersection point is within a predetermined range on the image output surface. The estimation unit estimates a position indicated by the instruction object on the image output surface based on the determination made by the determination unit.

18 Claims, 7 Drawing Sheets

(56) References Cited

U.S. PATENT DOCUMENTS

| | | |
|---|---|---|
| 2001/0043752 A1 | 11/2001 | Matsuura et al. |
| 2002/0031276 A1 | 3/2002 | Yagishita et al. |
| 2002/0191224 A1 | 12/2002 | Yagishita et al. |
| 2002/0191855 A1 | 12/2002 | Matsuura et al. |
| 2003/0012445 A1 | 1/2003 | Matsuura et al. |
| 2003/0039390 A1 | 2/2003 | Yagishita et al. |
| 2003/0048923 A1 | 3/2003 | Yagishita et al. |
| 2003/0128881 A1 | 7/2003 | Yagishita et al. |
| 2003/0198397 A1 | 10/2003 | Matsuura et al. |
| 2004/0071364 A1 | 4/2004 | Yamazaki et al. |
| 2004/0114819 A1 | 6/2004 | Matsuura et al. |
| 2004/0130738 A1 | 7/2004 | Yagishita et al. |
| 2004/0131265 A1 | 7/2004 | Yagishita et al. |
| 2004/0170329 A1 | 9/2004 | Yagishita et al. |
| 2004/0179239 A1 | 9/2004 | Yamazaki et al. |
| 2006/0097990 A1* | 5/2006 | Izumi ............... F16M 11/24 345/173 |
| 2006/0098873 A1* | 5/2006 | Hildreth ........... G06K 9/00375 382/181 |
| 2007/0071283 A1 | 3/2007 | Yagishita |
| 2008/0018595 A1* | 1/2008 | Hildreth ............... G06F 3/011 345/156 |
| 2008/0278450 A1* | 11/2008 | Lashina ............. G06F 3/0488 345/173 |
| 2009/0021794 A1 | 1/2009 | Hara et al. |
| 2009/0104990 A1* | 4/2009 | Tsujino ............... A63F 13/04 463/32 |
| 2010/0046044 A1 | 2/2010 | Ishizu et al. |
| 2011/0051173 A1 | 3/2011 | Yagishita |
| 2011/0141009 A1 | 6/2011 | Izumi |
| 2011/0320978 A1* | 12/2011 | Horodezky ......... G06F 3/0488 715/823 |
| 2012/0056989 A1* | 3/2012 | Izumi ............... H04N 13/0014 348/46 |
| 2012/0105490 A1* | 5/2012 | Pasquero ............. G06F 3/013 345/690 |
| 2012/0236344 A1 | 9/2012 | Nagase et al. |
| 2012/0268372 A1* | 10/2012 | Park .................. G06F 3/017 345/158 |
| 2013/0135218 A1* | 5/2013 | Jain .................. G06F 3/0488 345/173 |
| 2013/0154929 A1* | 6/2013 | Stopp ................ G06F 3/0416 345/157 |
| 2013/0254138 A1* | 9/2013 | Kudritskiy ............ G06N 3/08 706/11 |
| 2013/0307773 A1* | 11/2013 | Yagishita ............ G06F 3/0304 345/158 |
| 2013/0328762 A1* | 12/2013 | McCulloch ......... G02B 27/017 345/156 |
| 2013/0328770 A1* | 12/2013 | Parham .............. G06F 3/0304 345/157 |
| 2014/0006997 A1* | 1/2014 | Kim .................. G06F 3/0488 715/773 |
| 2014/0132542 A1* | 5/2014 | Lipman .............. G06F 3/0488 345/173 |
| 2014/0139430 A1* | 5/2014 | Leung ................. G06F 3/011 345/157 |
| 2014/0201666 A1* | 7/2014 | Bedikian .............. G06F 3/017 715/771 |
| 2014/0201689 A1* | 7/2014 | Bedikian .............. G06F 3/011 715/863 |
| 2014/0253511 A1* | 9/2014 | Yagishita ............ G06F 3/0425 345/175 |
| 2014/0336539 A1* | 11/2014 | Torres .................. A61B 5/11 600/595 |
| 2015/0370318 A1* | 12/2015 | Yamaguchi ........... G06F 3/005 345/157 |

FOREIGN PATENT DOCUMENTS

| | | |
|---|---|---|
| JP | 2009-116583 | 5/2009 |
| JP | 4318056 | 6/2009 |
| JP | 4608326 | 10/2010 |
| JP | 4783456 | 7/2011 |

* cited by examiner

RANGE WHERE USER'S HAND CAN REACH

INFORMATION PROCESSING DEVICE, SYSTEM, AND INFORMATION PROCESSING METHOD

CROSS-REFERENCE TO RELATED APPLICATIONS

The present application claims priority to and incorporates by reference the entire contents of Japanese Patent Application No. 2013-009243 filed in Japan on Jan. 22, 2013.

BACKGROUND OF THE INVENTION

1. Field of the Invention

The present invention relates to an information processing device, a system, and an information processing method.

2. Description of the Related Art

User interface (UI) devices have been developed that allow an operation input by, while viewing an image displayed on an screen and assuming a virtual operation surface in an empty space in front of the image, moving a finger and the like (instruction object) using the virtual operation surface as a touch panel. Such non-contact type UI devices employ an excellent UI technology to resolve disadvantages of a contact type UI device (for example, a screen may be contaminated with sebum and the like of a touching hand), attracting attention in recent years.

These UI devices should have a correspondence between coordinates on a real screen and coordinates on the virtual operation surface. For example, Japanese Patent Application Laid-open No. 2009-116583 describes a technique in which designation coordinates indicate a point at which the real screen intersects with the perpendicular line extending from a fingertip on the virtual operation surface in the normal direction of the real screen or an extension line of the motion vector of the fingertip.

A real screen having a large size (for example, 80 inches) can contain coordinates in such a wide range that a user cannot reach. As a distance to the target coordinates on the real screen increases, an angle between a straight line indicating the direction of the fingertip of the user and the normal line of the real screen increases. Accordingly, deviation increases between actual target coordinates and a point at which the real screen intersects with the perpendicular line extending from the fingertip in the normal direction of the real screen. That is, in the technique disclosed in Japanese Patent Application Laid-open No. 2009-116583, as the distance to the target coordinates on the real screen increases, accuracy in designating the coordinates deteriorates.

In view of the above-mentioned conventional problem, there is need to provide an information processing device, a system, and an information processing method that can improve accuracy in operation of designating coordinates on an image output surface through an instruction object.

SUMMARY OF THE INVENTION

It is an object of the present invention to at least partially solve the problems in the conventional technology.

According to the present invention, there is provided an information processing device comprising: a detection unit configured to detect each three-dimensional position of a plurality of parts of an instruction object for indicating an image output surface to which an image is output; a calculation unit configured to calculate an intersection point of a direction indicated by the instruction object and the image output surface based on each three-dimensional position of the parts of the instruction object detected by the detection unit; a determination unit configured to determine whether or not the intersection point is within a predetermined range on the image output surface; and an estimation unit configured to estimate a position indicated by the instruction object on the image output surface based on the determination made by the determination unit.

The present invention also provides a system including a display device that displays an image, and an information processing device connected to the display device, wherein the information processing device comprises a detection unit configured to detect each three-dimensional position of a plurality of parts of an instruction object for indicating a predetermined position on an image output surface to which the image is output; a calculation unit configured to calculate an intersection point of a direction indicated by the instruction object and the image output surface based on each three-dimensional position of the parts of the instruction object detected by the detection unit; a determination unit configured to determine whether or not the intersection point is within a predetermined range on the image output surface; and an estimation unit configured to estimate a position on the image output surface indicated by the instruction object based on the determination made by the determination unit.

The present invention also provides an information processing method comprising: detecting each three-dimensional position of a plurality of parts of an instruction object for indicating an image output surface onto which an image is output; calculating an intersection point of a direction indicated by the instruction object and the image output surface based on each three-dimensional position of the parts of the instruction object detected at the detecting; determining whether or not the intersection point is within a predetermined range on the image output surface; and estimating a position on the image output surface indicated by the instruction object based on the determination made at the determining.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes embodiments of an information processing device, a system, and an information processing method according to the present invention in details with reference to the accompanying drawings.

First Embodiment

Figure 1:
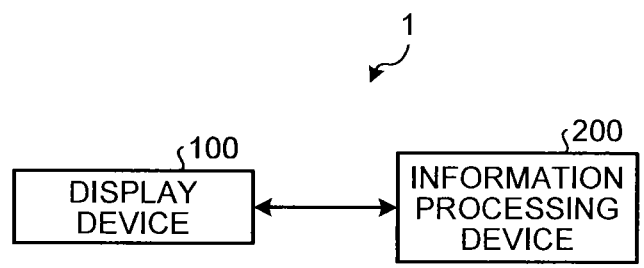
FIG. 1 is a schematic block diagram illustrating a configuration example of a system according to a first embodiment.

FIG. 1 is a schematic block diagram illustrating a configuration example of a system 1 according to a first embodiment. As illustrated in FIG. 1, the system 1 includes at least a display device 100 and an information processing device 200 that are connected to each other. In the first embodiment, the display device 100 includes, but not limited thereto, a projector (an example of the image projection device) that projects an image on a projection object such as a wall surface.

In the first embodiment, a virtual operation surface is assumed to be in an empty space in front of a projection region (an example of an image output surface on which an image is output) indicating a region, on which an image is projected, in the projection object. A user (operator) moves an instruction object such as a hand (finger) or a pen in the virtual operation surface to designate the coordinates of a predetermined position on the projection region. That is, the user performs an operation of designating the coordinates on the projection region in a non-contact manner. In an example of FIG. 2, a user (operator) 101 is extending his/her hand toward a target coordinate point 103 such as a button icon displayed in a projection region 102. Herein, the normal direction of the projection region 102 intersects with the vertical direction (gravity direction) at a right angle, and it is assumed that the normal direction of the projection region 102 is the Z-axis, the vertical direction is the Y-axis, and the horizontal direction is the X-axis. However, a method for setting the coordinate system is not limited thereto.

Figure 2:
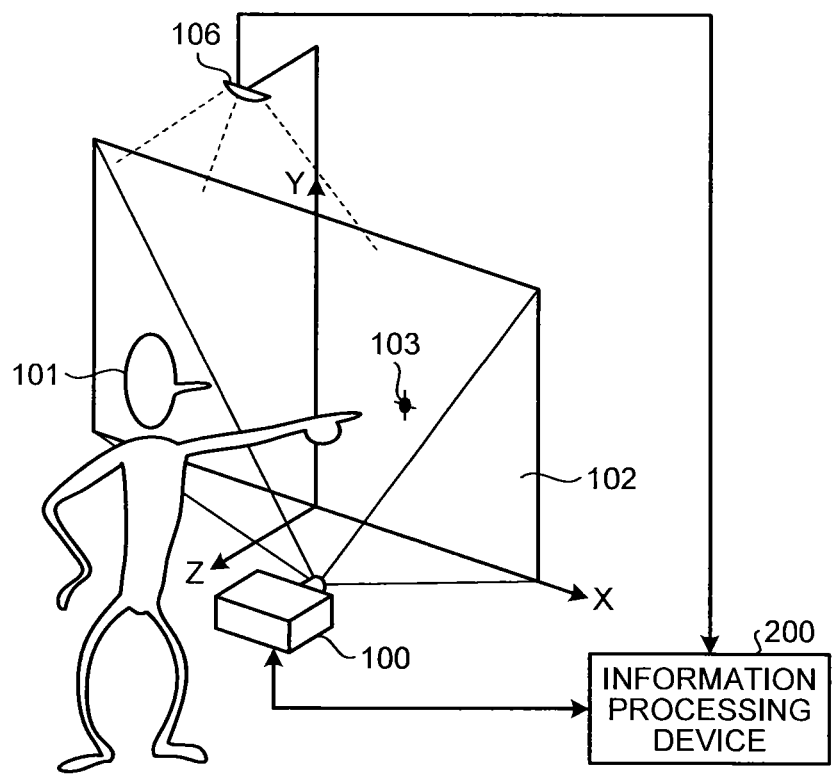
FIG. 2 is a diagram illustrating a situation where a user is extending his/her hand toward target coordinates on a projection region.

In the example of FIG. 2, a sensor 106 fixed at an upper part of the projection region 102 measures the position of the hand (position of the hand in the space in front of the projection region 102) of the user 101. The sensor 106 is configured as what is called a three-dimensional distance sensor including a light-emitting unit that emits infrared light and a light-receiving unit that receives the light reflected at the hand. The three-dimensional distance sensor is generally used for gesture recognition, and can measure a three-dimensional distance between a point irradiated with light (irradiation point) and the sensor 106 based on a pattern shape of the received light, a light-receiving angle, and a time period from emission of light to reception of the light. If a three-dimensional positional relation between the sensor 106 and the projection region 102 is known, a three-dimensional positional relation between the irradiation point (position of the hand) and the projection region 102 can be measured. On the other side, the sensor 106 may be assumed to measure the three-dimensional position of the irradiation point. In this example, it may be considered that the sensor 106 is included in the system 1.

In the first embodiment, when the hand of the user 101 exists in a space where the sensor 106 performs measurement in front of the projection region 102 (hereinafter, referred to as an "object space" in some cases), the sensor 106 measures the three-dimensional distance between the projection region 102 and each of a plurality of parts of the hand of the user 101, and outputs information representing a measurement result thereof to the information processing device 200.

The information processing device 200 estimates the position in the projection region 102 (designation coordinates) corresponding to the position of the instruction object on the virtual operation surface from the output from the sensor 106, and outputs information indicating the designation coordinates to the display device 100. Details of the information processing device 200 will be described later. The display device 100 switches display according to the designation coordinates estimated by the information processing device 200. For example, when a button icon is displayed at the designation coordinates, that is estimated by the information processing device 200, in the projection region 102, the button icon is determined to be touched, and an image corresponding to the touch operation of the button icon is projected and displayed.

Figure 3:
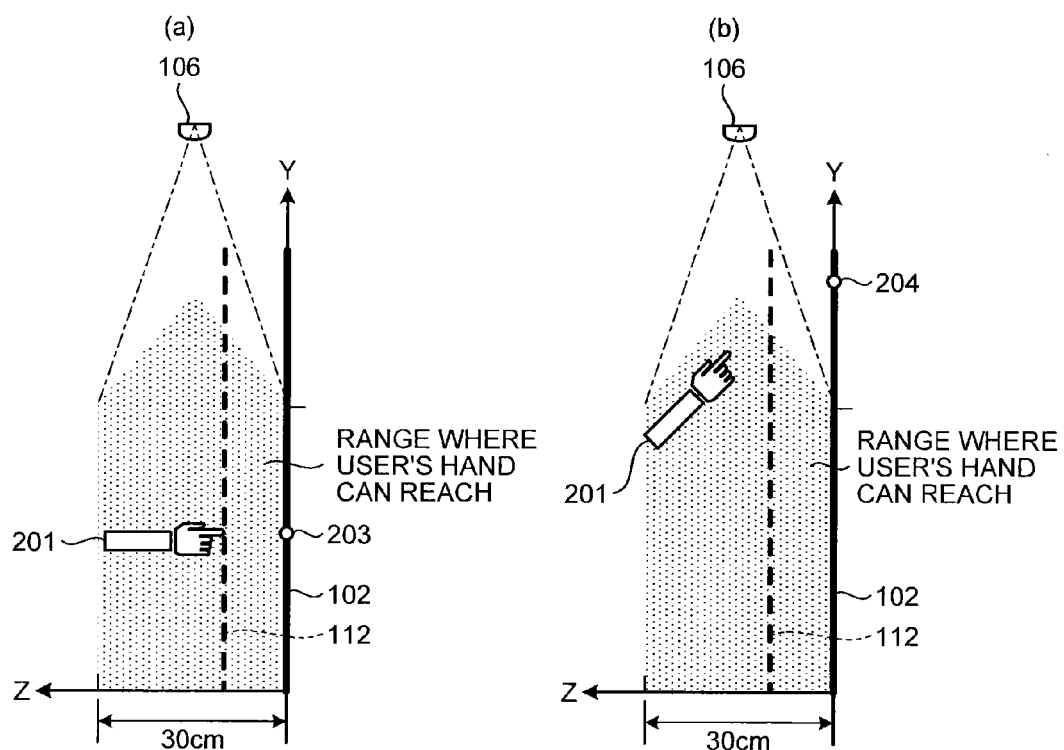
FIGS. 3(a) and 3(b) are schematic diagrams illustrating the projection region viewed from a side.

FIGS. 3(*a*) and 3(*b*) are schematic diagrams illustrating the projection region 102 viewed from a side. FIG. 3(*a*) illustrates a case in which a target coordinate point 203 is at a position where a user's hand 201 can reach, and FIG. 3(*b*) illustrates a case in which a target coordinate point 204 is at a position where the user's hand 201 cannot reach. A person naturally puts his/her finger into a virtual operation surface 112 as if he/she touches the target coordinate point 203 in the projection region 102 in the case of FIG. 3(*a*). However, in the case of FIG. 3(*b*), a person indicates a direction toward the target coordinate point 204 with his/her finger irrespective of the virtual operation surface 112.

The present invention utilizes the fact that, as described above, the person indicates target coordinates differently depending on whether or not there are the target coordinates at a position where the user's hand 201 can reach. In the case of FIG. 3(*a*), a position indicated by the user is estimated to be a coordinate point in the projection region 102, that have the shortest distance from a point at the virtual operation surface 112 through which the finger passes. In the case of FIG. 3(*b*), the position indicated by the user is estimated to be an intersection point of the projection region 102 and a direction indicated by the entire hand 201, not only the fingertip. This improves accuracy in designating coordinates on the projection region 102 through the instruction object such as the user's hand 201.

Figure 4:
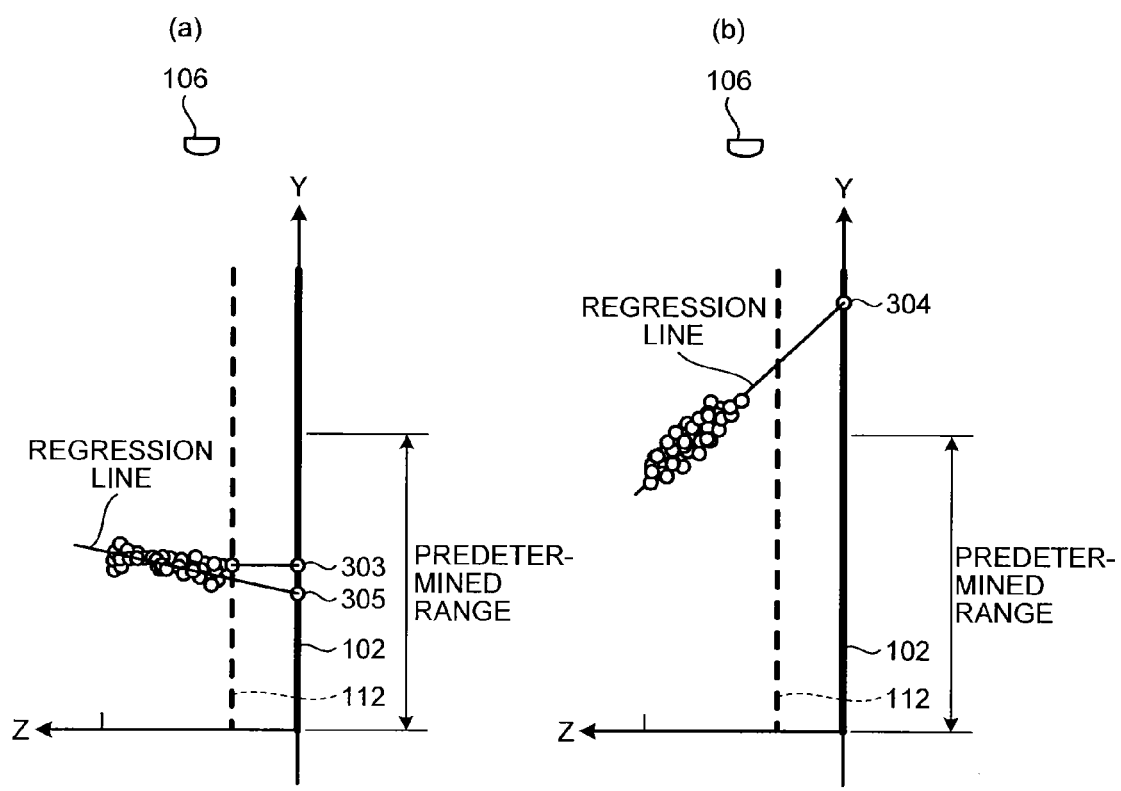
FIGS. 4(a) and 4(b) are schematic diagrams illustrating situations where a user's hand is measured with a sensor.

FIGS. 4(*a*) and 4(*b*) are schematic diagrams illustrating situations where the user's hand 201 is measured with the sensor 106. FIG. 4(*a*) corresponds to FIG. 3(*a*), and FIG. 4(*b*) corresponds to FIG. 3(*b*). The sensor 106 measures a three-dimensional distance between the projection region 102 and each of a plurality of parts of the user's hand 201 within substantially the same time period. Each one of the circles illustrated in FIGS. 4(*a*) and 4(*b*) represents a measurement point corresponding to any one of the parts of the user's hand 201. In the case of FIG. 4(*a*), within a range previously set as a range where the user's hand 201 can reach in the projection region 102, there is a coordinate point 305 at which the projection region 102 intersects with a regression line representing a direction indicated by the hand 201 (an example of a virtual line representing the direction indicated by the hand 201) calculated from a plurality of measurement points corresponding to the respective parts of the hand 201. Accordingly, a coordinate point 303 is estimated as a position indicated by the user's hand 201, the coordinate point 303 being a point at which the projection region 102 intersects with a straight line extending from the fingertip passing through the virtual operation surface 112 to the projection region 102 in the Z direction (the normal direction of the projection region 102). In the case of FIG. 4(b), a coordinate point 304 at which the regression line intersects with the projection region 102 exists outside the predetermined range, so that the coordinate point 304 is estimated as a position indicated by the user's hand 201.

The following describes a range of the object space representing a space in which the sensor 106 performs measurement. As described above, in the first embodiment, an operation of designating coordinates (target coordinates) on the projection region 102 can be performed without touching the projection region 102. If the user can always reach the target coordinates, the sensor 106 may perform measurement only on the virtual operation surface 112 set in parallel with the projection region 102 (preferably at a distance of 10 cm from the projection region 102 so as to keep the user from contacting the projection region 102). However, in the present disclosure, it is assumed that there is a case in which the hand 201 cannot reach the target coordinates (for example, the hand 201 cannot reach a position corresponding to a position at a height equal to or higher than a predetermined value in the projection region 102, and the hand 201 cannot reach positions corresponding to the left and right ends of the projection region 102, assuming that the user does not move from a predetermined position).

Figure 5:
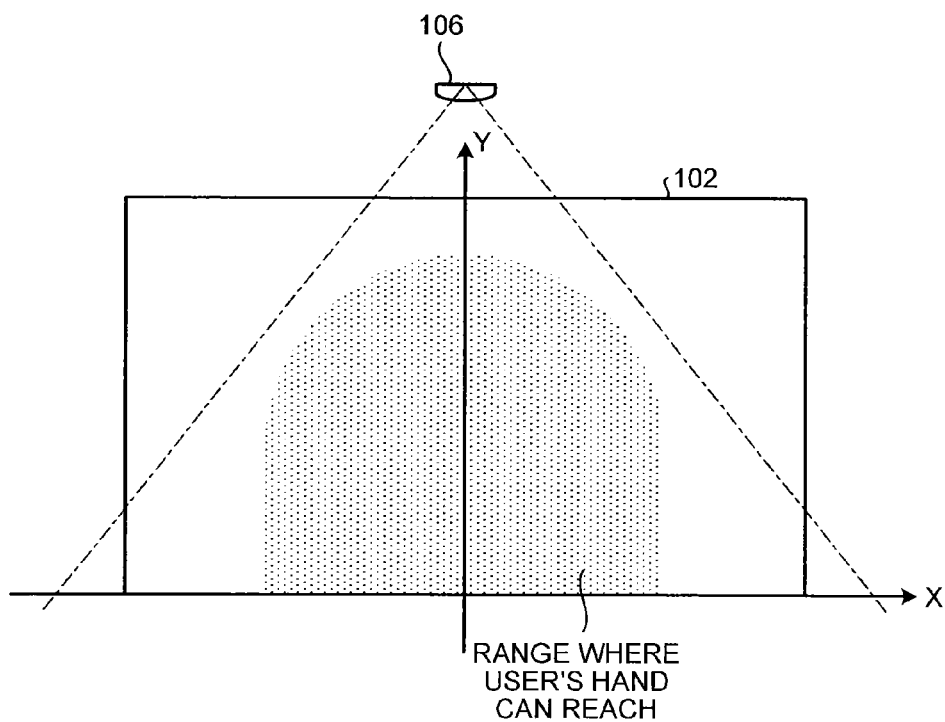
FIG. 5 is a schematic diagram illustrating the projection region viewed from the front.

To calculate the regression line, it is thus necessary to measure each position of the parts of the hand 201 in a three-dimensional space, not on a two-dimensional plane. To improve accuracy of calculation of the regression line, the sensor 106 preferably has a configuration of measuring the three-dimensional distance between the projection region 102 and each of the parts of the user's hand 201 existing in a space within 30 cm from the projection region 102 in the normal direction thereof. In the first embodiment, the object space is set as the space within 30 cm from the projection region 102 in the normal direction thereof. However, it is sufficient that the object space is in a range where the user's hand 201 can reach. In FIGS. 3(a) and 3(b), a range indicated by dotted area represents a range where the hand 201 can reach, and a range enclosed by alternate long and short dash lines represents the object space. FIG. 5 is a schematic diagram illustrating the projection region 102 viewed from the front. In this example, the user is assumed to exist substantially at the middle of the projection region 102, the range where the user's hand 201 can reach is the range indicated by dotted area, and the object space is in the range enclosed by the alternate long and short dash lines. As illustrated in FIG. 5, the object space is set to include the range where the user's hand 201 can reach.

Figure 6:
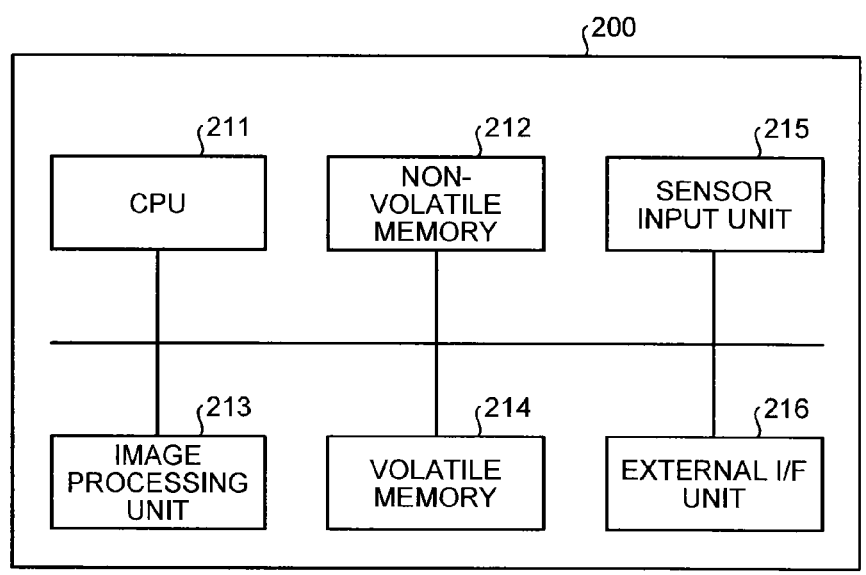
FIG. 6 is a block diagram illustrating a hardware configuration example of an information processing device according to the first embodiment.

FIG. 6 is a block diagram illustrating a hardware configuration example of the information processing device 200. As illustrated in FIG. 6, the information processing device 200 includes a CPU 211, a non-volatile memory 212, an image processing unit 213, a volatile memory 214, a sensor input unit 215, and an external I/F unit 216.

The CPU 211 totally controls the entire operation of the information processing device 200. The non-volatile memory 212 stores therein data or computer programs executed by the CPU 211. For example, the non-volatile memory 212 includes a ROM or an HDD. For example, the image processing unit 213 includes circuits such as an ASIC or a DSP, and processes data at high speed. The volatile memory 214 functions as a working memory that loads data processed by the CPU 211, the computer programs executed by the CPU 211, and the like. For example, the volatile memory 214 includes a RAM. The sensor input unit 215 controls the sensor 106 and also has a function for transmitting/receiving information to/from the sensor 106 (receiving an output from the sensor 106, for example) under the control of the CPU 211. The external I/F unit 216 is an I/F (a bus, Ethernet (registered trademark), a telephone line, radio, or the like) connected to an external device or a storage medium (an IC card, a CD, a DVD, and the like).

Figure 7:
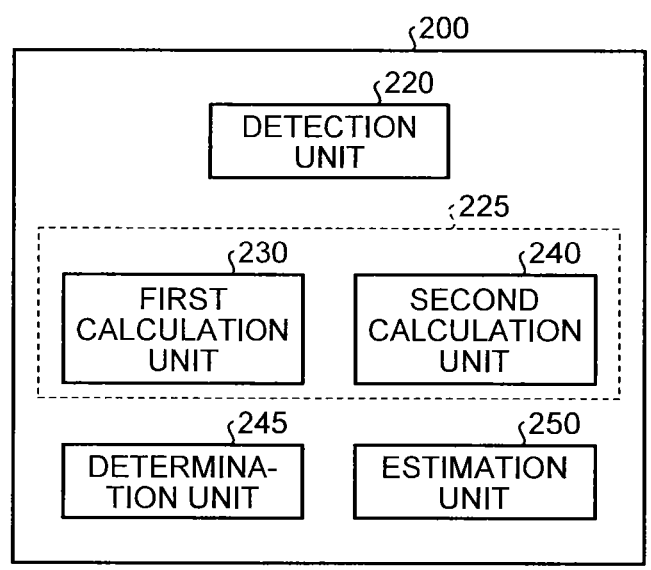
FIG. 7 is a block diagram illustrating a functional configuration example of the information processing device according to the first embodiment.

FIG. 7 is a block diagram illustrating a functional configuration example of the information processing device 200. As illustrated in FIG. 7, the information processing device 200 includes a detection unit 220, a calculation unit 225, a determination unit 245, and an estimation unit 250.

The detection unit 220 detects each three-dimensional position of a plurality of parts of the instruction object for indicating the image output surface (projection region 102) onto which an image is output. More specifically, the detection unit 220 detects each three-dimensional position of the parts of the instruction object existing in a space in front of the image output surface. Even more specifically, the detection unit 220 detects each three-dimensional position of the parts of the instruction object existing in a space within 30 cm from the image output surface in the normal direction thereof.

In the first embodiment, the detection unit 220 detects each three-dimensional position of the parts of the user's hand 201 existing in the object space based on outputs from the sensor 106. In this example, the detection unit 220 is given the three-dimensional positional relation between the sensor 106 and the projection region 102 in advance, so that the detection unit 220 can detect the three-dimensional position of each measurement from each of the three-dimensional distances of measurement points measured by the sensor 106.

The calculation unit 225 calculates an intersection point of the direction indicated by the instruction object and the image output surface based on each three-dimensional position of a plurality of parts of the instruction object detected by the detection unit 220. More specific description follows. As illustrated in FIG. 7, in the first embodiment, the calculation unit 225 includes a first calculation unit 230 and a second calculation unit 240. The first calculation unit 230 calculates a virtual line representing the direction indicated by the instruction object based on each three-dimensional position of the parts of the instruction object detected by the detection unit 220. In the first embodiment, the first calculation unit 230 calculates a regression line representing the direction indicated by the hand 201 based on each three-dimensional position of the parts of the user's hand 201 detected by the detection unit 220.

The second calculation unit 240 calculates an intersection point representing a point (coordinates) where the image output surface intersects with the virtual line. In the first embodiment, the second calculation unit 240 calculates an intersection point of the projection region 102 and the regression line calculated by the first calculation unit 230.

The determination unit 245 determines whether or not the intersection point calculated by the calculation unit 225 is within a predetermined range on the image output surface. The estimation unit 250 estimates the position indicated by the instruction object on the image output surface based on the determination made by the determination unit 245. More specific description follows. If the determination unit 245 determines that the intersection point calculated by the calculation unit 225 (second calculation unit 240) is within the predetermined range, the estimation unit 250 estimates, as the position indicated by the instruction object, the coordinates of a position on the image output surface that have the shortest distance between the image output surface and any one of the parts of the instruction object. More specifically, if the determination unit 245 determines that the intersection point is within the predetermined range, the estimation unit 250 estimates, as the position indicated by the instruction object, the coordinates of a position on the image output surface that have the shortest distance to any one of the parts passing through a virtual operation surface in the space in front of the image output surface toward the image output surface, among the parts of which three-dimensional positions are detected by the detection unit 220. Even more specifically, if the determination unit 245 determines that the intersection point is represented by coordinates within the predetermined range, the estimation unit 250 estimates, as the position indicated by the instruction object, the coordinates of a position on the image output surface that have the shortest distance to a part passing through the virtual operation surface in the space in front of the image output surface toward the image output surface and is the closest to the image output surface, among the parts of which three-dimensional positions are detected by the detection unit 220.

If the determination unit 245 determines that the intersection point calculated by the calculation unit 225 (second calculation unit 240) is outside the predetermined range, the estimation unit 250 estimates the intersection point as the position indicated by the instruction object. In the first embodiment, the image output surface is the projection region 102 and the instruction object is the user's hand 201. However, the embodiment is not limited thereto. The predetermined range described above indicates a range set as a range where the user's hand 201 can reach on the image output surface.

In the first embodiment, each function of the detection unit 220, the calculation unit 225 (the first calculation unit 230 and the second calculation unit 240), the determination unit 245, and the estimation unit 250 is implemented by executing computer programs stored in the non-volatile memory 212 and the like with the CPU 211. However, the embodiment is not limited thereto. For example, at least part of the functions of the detection unit 220, the calculation unit 225 (the first calculation unit 230 and the second calculation unit 240), the determination unit 245, and the estimation unit 250 may be implemented with a dedicated hardware circuit (for example, the image processing unit 213).

Figure 8:
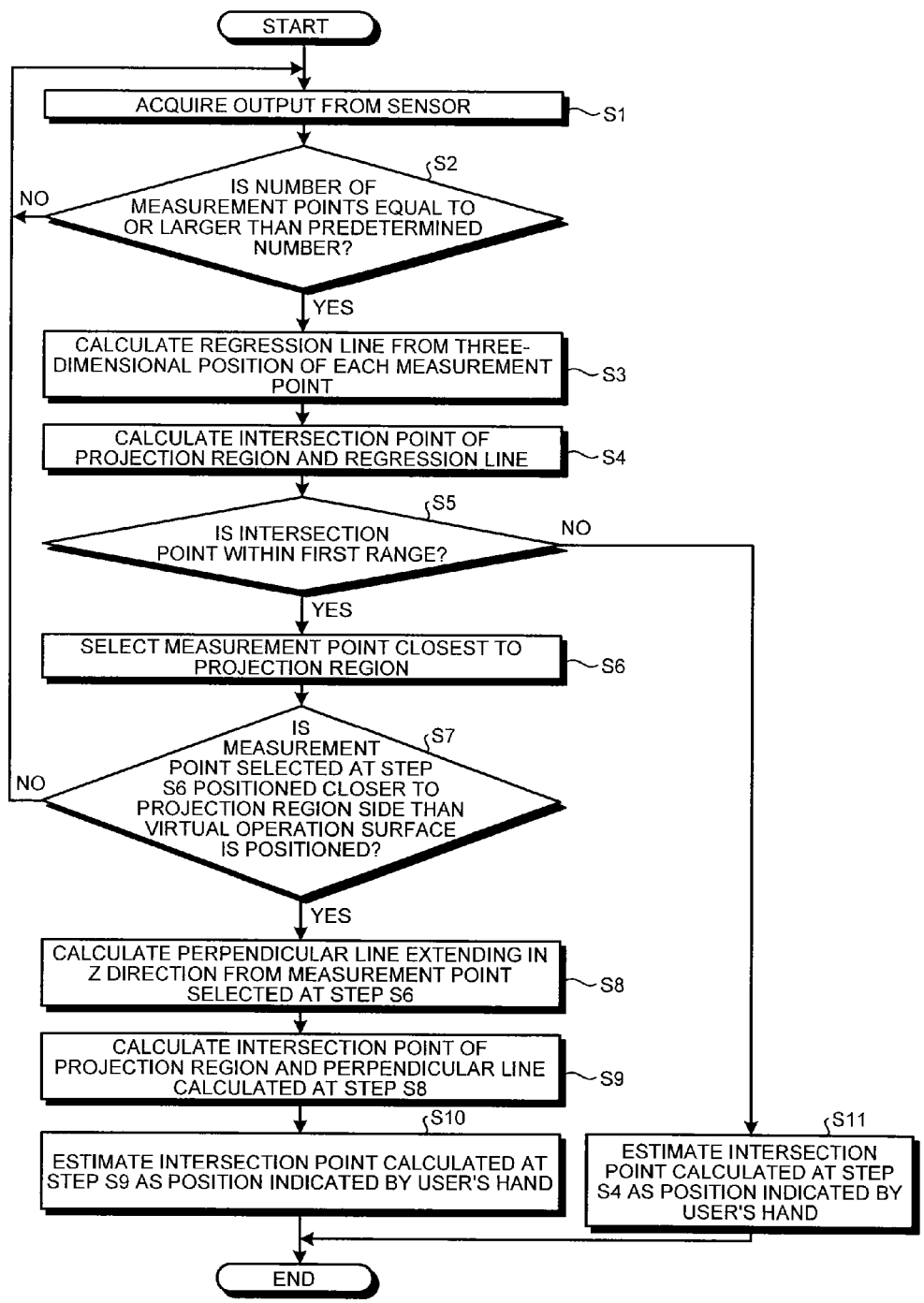
FIG. 8 is a flowchart illustrating an example of processing performed by the information processing device.

FIG. 8 is a flowchart illustrating an example of processing performed by the information processing device 200. As illustrated in FIG. 8, the detection unit 220 first acquires an output from the sensor 106 (Step S1). Next, the detection unit 220 determines whether or not the number of measurement points of which three-dimensional distances are measured by the sensor 106 (the number of measurement points corresponding to the parts of the hand 201) is equal to or larger than a predetermined number (Step S2). In the configuration illustrated in FIG. 2, though a large number of measurement points on a floor of which three-dimensional distances are measured when the user's hand 201 is not existed in the object space, it can still determine whether the measurement points are of the parts of the hand 201 or the floor because the position of the floor is known.

At Step S2, if it is determined that the number of measurement points of which three-dimensional distances are measured by the sensor 106 is equal to or larger than the predetermined number (Yes at Step S2), the detection unit 220 outputs, to the first calculation unit 230, information indicating each three-dimensional position of the measurement points corresponding to the respective parts of the user's hand 201. The first calculation unit 230 calculates the regression line representing the direction indicated by the user's hand 201 from the three-dimensional position of each measurement point (Step S3).

Next, the second calculation unit 240 calculates an intersection point of the projection region 102 and the regression line calculated at Step S3 (Step S4). Subsequently, the determination unit 245 determines whether or not the intersection point calculated at Step S4 is within a predetermined range (Step S5).

At Step S5, if it is determined that the intersection point calculated at Step S4 is within the predetermined range (Yes at Step S5), the estimation unit 250 selects a measurement point closest to the projection region 102 (a measurement point nearest to the projection region 102) from among the measurement points of which three-dimensional positions are detected by the detection unit 220 (Step S6). Next, the estimation unit 250 determines whether or not the measurement point selected at Step S6 is positioned closer to the projection region 102 side than the virtual operation surface 112 is positioned (Step S7). If it is determined that the measurement point selected at Step S6 is positioned closer to the projection region 102 side than the virtual operation surface 112 is positioned (Yes at Step S7), the estimation unit 250 calculates a perpendicular line extending from the measurement point selected at Step S6 in the Z direction (the normal direction of the projection region 102) (Step S8). Next, the estimation unit 250 calculates an intersection point of the projection region and the perpendicular line calculated at Step S8 (Step S9). Subsequently, the estimation unit 250 estimates the intersection point calculated at Step S9 as the position indicated by the user's hand 201 (Step S10).

At Step S5 described above, if it is determined that the intersection point calculated at Step S4 is outside the predetermined range (No at Step S5), the estimation unit 250 estimates the intersection point calculated at Step S4 as the position indicated by the user's hand 201 (Step S11).

As described above, in the first embodiment, if the intersection point of the projection region 102 and the direction indicated by the user's hand 201 is within the predetermined range set in advance as a range where the user's hand 201 can reach, the coordinates of the position on the projection region 102 that have the shortest distance to any one of the parts of the user's hand 201 (in the first embodiment, a part passing through the virtual operation surface 112 and being the closest to the projection region 102 among the parts of the user's hand 201) is estimated as the position indicated by the user's hand 201. If the intersection point is outside the predetermined range, the intersection point is estimated as the position indicated by the user's hand 201. Accordingly, accuracy can be improved in operation of designating the coordinates on the projection region 102 through the instruction object such as the user's hand 201.

Second Embodiment

Next, a second embodiment will be described. The second embodiment is different from the first embodiment in that the predetermined range is variably determined. Specific description follows. Any component in common with that in the first embodiment is denoted by the same reference numeral, and description thereof is not repeated here.

Figure 9:
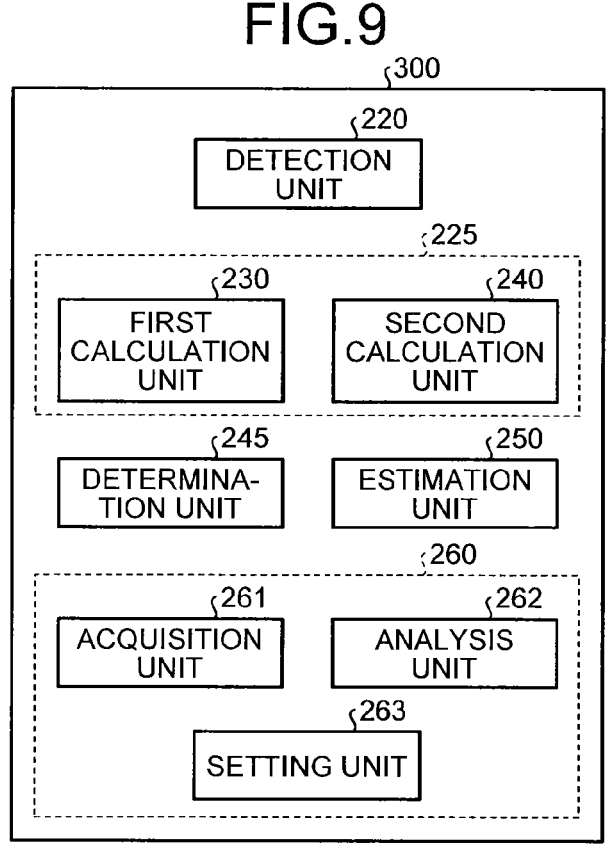
FIG. 9 is a block diagram illustrating a functional configuration example of an information processing device according to a second embodiment.

FIG. 9 is a block diagram illustrating a functional configuration example of an information processing device 300 according to the second embodiment. As illustrated in FIG. 9, the information processing device 300 is different from the first embodiment in that it further includes a first setting unit 260 that variably sets the predetermined range based on the three-dimensional position of the instruction object. The process of setting the predetermined range (hereinafter, referred to as a "calibration process" in some cases) by the first setting unit 260 is performed before the process in FIG. 8 is performed. In the second embodiment, when the calibration process starts, the information processing device 300 notifies the user of information that prompts the user to horizontally extend the hand 201 toward the projection region 102 from a predetermined position. For example, a notification image may be output or a notification voice may be output.

As illustrated in FIG. 9, the first setting unit 260 includes an acquisition unit 261, an analysis unit 262, and a setting unit 263. The acquisition unit 261 requests to the detection unit 220 for information indicating each three-dimensional position of the parts of the user's hand 201 horizontally extending toward the projection region 102, and acquires the information indicating each three-dimensional position of the parts of the user's hand 201 from the detection unit 220 as a response to the request.

The analysis unit 262 analyzes the information indicating each three-dimensional position of the parts of the user's hand 201 acquired by the acquisition unit 261 to calculate the regression line representing the direction indicated by the user's hand 201, and determines from the calculated regression line whether the user extends the hand 201 horizontally. For example, the analysis unit 262 may determine whether or not an angle formed by the calculated regression line and a reference line indicating the normal direction of the projection region 102 prepared in advance is equal to or less than a threshold. If the angle formed by the calculated regression line and the reference line is equal to or less than the threshold, the analysis unit 262 may determine that the user extends the hand 201 horizontally.

If it is determined that the user extends the hand 201 horizontally, the analysis unit 262 calculates the intersection point of the projection region 102 and the calculated regression line. The setting unit 263 estimates a range where the user's hand 201 can reach in the projection region 102 from the intersection point calculated by the analysis unit 262, and sets the estimated range as the predetermined range.

The intersection point of the projection region 102 and the regression line representing the direction indicated by the user's hand 201 extending horizontally indicates varies depending on the physique (height, for example) of the user. According to the second embodiment, the predetermined range is variably determined depending on the physique of the user, so that the accuracy can be further improved in the operation of designating the coordinates on the projection region 102 through the instruction object.

First Modification of Second Embodiment

For example, when performing the calibration process, the information processing device 300 may display a specific image at a predetermined position (for example, near the center) on the projection region 102, and may notify the user of information that prompts the user to extend the hand 201 toward the specific image.

In this case, the acquisition unit 261 requests to the detection unit 220 for information indicating each three-dimensional position of the parts of the user's hand 201 extending toward the specific image displayed on the predetermined position on the projection region 102, and may acquire the information indicating each three-dimensional position of the parts of the user's hand 201 from the detection unit 220 as a response to the request.

The analysis unit 262 analyzes the information indicating each three-dimensional position of the parts of the user's hand 201 acquired by the acquisition unit 261 to calculate the regression line representing the direction indicated by the user's hand 201, and may calculate an angle formed by the calculated regression line and the reference line representing the normal direction of the projection region 102. The value of the angle varies depending on the physique of the user. For example, the angle corresponding to a user who is not tall has a larger value than that of the angle corresponding to a user who is tall.

Then the setting unit 263 estimates the range where the user's hand 201 can reach, based on the angle calculated by the analysis unit 262, and sets the estimated range as the predetermined range.

Also in this modification, the predetermined range is variably determined depending on the physique of the user, so that the accuracy can be further improved in the operation of designating the coordinates on the projection region 102 through the instruction object.

Second Modification of Second Embodiment

For example, the analysis unit 262 may analyze the information indicating each three-dimensional position of the parts of the user's hand 201 acquired by the acquisition unit 261 to estimate the height of the user. In this case, the setting unit 263 estimates the range where the user's hand 201 can reach in the projection region 102, based one the height of the user estimated by the analysis unit 262, and sets the estimated range as the predetermined range.

In this modification, when the calibration process starts, the information processing device 300 may notify the user of information that prompts the user at a predetermined position to horizontally extend the hand 201 toward the projection region 102, or may display a specific image on a predetermined position on the projection region 102 and notify the user of information that prompts the user to extend the hand 201 toward the specific image.

Third Embodiment

Next, a third embodiment will be described. The third embodiment is different from the embodiments described above in that an input of physique information indicating the physique of the user is received and the predetermined range described above is variably determined based on the received input. Specific description follows. Any component in common with that in the embodiments described above is denoted by the same reference numeral, and description thereof is not repeated here.

Figure 10:
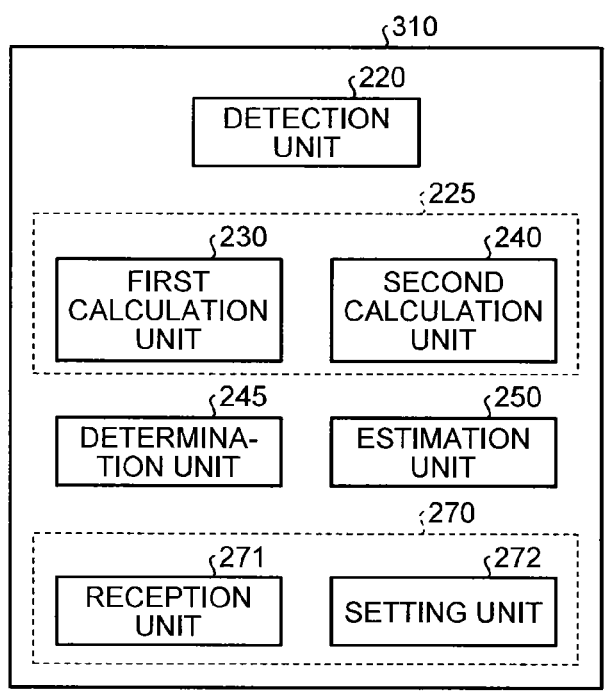
FIG. 10 is a block diagram illustrating a functional configuration example of an information processing device according to a third embodiment.

FIG. 10 is a block diagram illustrating a functional configuration example of an information processing device 310 according to the third embodiment. As illustrated in FIG. 10, the information processing device 310 is different from the embodiments described above in that it has a second setting unit 270 that receives an input of the physique information and variably sets the predetermined range based on the received input. In this example, the physique information is information indicating the height of the user, but not limited thereto. The process of setting the predetermined range (calibration process) by the second setting unit 270 is performed before the process in FIG. 8 is performed. In the third embodiment, when the calibration process starts, the information processing device 310 notifies the user of information that prompts the user to input his/her height (an example of the physique information). For example, a notification image may be output or a notification voice may be output.

As illustrated in FIG. 10, the second setting unit 270 includes a reception unit 271 and a setting unit 272. The reception unit 271 receives an input of the height from the user. The setting unit 272 estimates the range where the user's hand 201 can reach in the projection region 102 from the input (information indicating the height) received at the reception unit 271, and sets the estimated range as the predetermined range.

Also in the third embodiment, the predetermined range is variably determined depending on the physique of the user, so that the accuracy can be further improved in the operation of designating the coordinates on the projection region 102 through the instruction object.

The information processing device (200, 300, 310) according to the embodiments described above is preferably integrated with the display device 100 from a viewpoint of installation easiness. For example, the integrated device may be considered as an image projection device that projects an image on a projection object. That is, the present invention can be applied to the image projection device. The image projection device according to the present invention may include a detection unit that detects each three-dimensional position of parts of the instruction object for indicating the predetermined position of the projection region, a calculation unit that calculates an intersection point of a direction indicated by the instruction object and an image output surface based on each three-dimensional position of the parts of the instruction object detected by the detection unit, a determination unit that determines whether or not the intersection point is within the predetermined range on the image output surface, and an estimation unit that estimates the position indicated by the instruction object on the image output surface based on the determination made by the determination unit.

For example, the display device 100 may be a liquid crystal display device. The image output surface to which the image is output may be a horizontal surface of which normal direction corresponds to the vertical direction. The sensor 106 for measuring the three-dimensional distance is not limited to an optical type, and may be an ultrasonic type. The position of the sensor 106 is not limited to the upper side of the image output surface, and may be the lower side thereof.

A computer program executed by the information processing device (200, 300, 310) described above may be provided by being recorded in a non-transitory computer-readable recording medium such as a CD-ROM, a flexible disk (FD), a CD-R, and a digital versatile disc (DVD) as an installable or executable file.

The computer program executed by the information processing device (200, 300, 310) described above may be provided by being stored on a computer connected to a network such as the Internet to be downloaded via the network. The computer program executed by the information processing device (200, 300, 310) described above may be provided or distributed via a network such as the Internet.

The present invention can achieve an advantageous effect of improved accuracy in operation of designating coordinates on the image output surface through the instruction object.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
   circuitry configured to
      detect three-dimensional positions of a plurality of parts of an instruction object of a user for indicating a position on an image output surface to which an image is output,
      calculate an intersection point of a direction indicated by the instruction object and the image output surface based on the detected three-dimensional positions of the parts of the instruction object,
      determine whether or not the intersection point is within a predetermined range on the image output surface, the predetermined range corresponding to a region of the image output surface reachable by the instruction object of the user,
      when it is determined that the intersection point is within the predetermined range,
         select a position of the detected three-dimensional positions of the parts of the instruction object, the selected position being closest to the image output surface among the detected three-dimensional positions,
         determine whether the selected position is within a predetermined distance from the image output surface, and
         when it is determined that the selected position is within the predetermined distance from the image output surface, estimate, as the position indicated by the instruction object, coordinates of a position on the image output surface having a shortest distance between the image output surface and the selected position, and
      when it is determined that the intersection point is outside the predetermined range, estimate the intersection point as the position indicated by the instruction object.

2. The information processing device according to claim 1, wherein the circuitry is configured to detect the three-dimensional positions of the parts of the instruction object existing in a space in front of the image output surface.

3. The information processing device according to claim 2, wherein the circuitry is configured to detect the three-dimensional positions of the parts of the instruction object existing in a space within 30 cm from the image output surface in a normal direction thereof.

4. The information processing device according to claim 1, wherein the predetermined distance corresponds to a distance from a virtual operation surface in front of the image output surface to the image output surface.

5. The information processing device according to claim 4, wherein the predetermined distance is 10 cm.

6. The information processing device according to claim 1, wherein the circuitry is configured to variably set the predetermined range based on the three-dimensional positions of the instruction object.

7. The information processing device according to claim 1, wherein the circuitry is configured to receive an input of physique information indicating a physique of a user and to variably set the predetermined range based on the received physique information.

8. The information processing device according to claim 1, wherein the circuitry is configured to
- calculate a virtual line representing the direction indicated by the instruction object based on the three-dimensional positions of the parts of the instruction object, and
- calculate the intersection point indicating a point at which the image output surface intersects with the virtual line.

9. A system comprising:
- a display device that displays an image; and
- an information processing device connected to the display device, wherein the information processing device comprises
- circuitry configured to
  - detect three-dimensional positions of a plurality of parts of an instruction object of a user for indicating a position on an image output surface to which the image is output,
  - calculate an intersection point of a direction indicated by the instruction object and the image output surface based on the detected three-dimensional positions of the parts of the instruction object,
  - determine whether or not the intersection point is within a predetermined range on the image output surface, the predetermined range corresponding to a region of the image output surface reachable by the instruction object of the user,
  - when it is determined that the intersection point is within the predetermined range,
    - select a position of the detected three-dimensional positions of the parts of the instruction object, the selected position being closest to the image output surface among the detected three-dimensional positions,
    - determine whether the selected position is within a predetermined distance from the image output surface, and
    - when it is determined that the selected position is within the predetermined distance from the image output surface, estimate, as the position indicated by the instruction object, coordinates of a position on the image output surface having a shortest distance between the image output surface and the selected position, and
  - when it is determined that the intersection point is outside the predetermined range, estimate the intersection point as the position indicated by the instruction object.

10. The system according to claim 9, wherein the circuitry of the information processing device is configured to detect the three-dimensional positions of the parts of the instruction object existing in a space in front of the image output surface.

11. The system according to claim 10, wherein the circuitry of the information processing device is configured to detect the three-dimensional positions of the parts of the instruction object existing in a space within 30 cm from the image output surface in a normal direction thereof.

12. The system according to claim 9, wherein the predetermined distance corresponds to a distance from a virtual operation surface in front of the image output surface toward the image output surface.

13. The system according to claim 12, wherein the predetermined distance is 10 cm.

14. The system according to claim 9, wherein the circuitry of the information processing device is configured to variably set the predetermined range based on the three-dimensional positions of the instruction object.

15. The system according to claim 9, wherein the circuitry of the information processing device is configured to receive an input of physique information indicating a physique of a user and to variably set the predetermined range based on the received physique information.

16. The system according to claim 9, wherein the circuitry of the information processing device is configured to
- calculate a virtual line representing the direction indicated by the instruction object based on the three-dimensional positions of the parts of the instruction object; and
- calculate the intersection point indicating a point at which the image output surface intersects with the virtual line.

17. An information processing method comprising:
- detecting three-dimensional positions of a plurality of parts of an instruction object of a user for indicating a position on an image output surface onto which an image is output;
- calculating an intersection point of a direction indicated by the instruction object and the image output surface based on the detected three-dimensional positions of the parts of the instruction object;
- determining whether or not the intersection point is within a predetermined range on the image output surface, the predetermined range corresponding to a region of the image output surface reachable by the instruction object of the user;
- when it is determined that the intersection point is within the predetermined range,
  - selecting a position of the detected three-dimensional positions of the parts of the instruction object, the selected position being closest to the image output surface among the detected three-dimensional positions,
  - determining whether the selected position is within a predetermined distance from the image output surface, and
  - when it is determined that the selected position is within the predetermined distance from the image output surface, estimating, as the position indicated by the instruction object, coordinates of a position on the image output surface having a shortest distance between the image output surface and the selected position; and
- when it is determined that the intersection point is outside the predetermined range, estimating the intersection point as the position indicated by the instruction object.

18. The information processing method according to claim 17, further comprising:
- calculating a virtual line representing the direction indicated by the instruction object based on the three-dimensional positions of the parts of the instruction object; and
- calculating the intersection point indicating a point at which the image output surface intersects with the virtual line.

* * * * *